Oct. 25, 1949.  R. F. RUSCH ET AL  2,485,663
AUTOMATIC NAVIGATOR
Filed Sept. 14, 1945  4 Sheets-Sheet 1
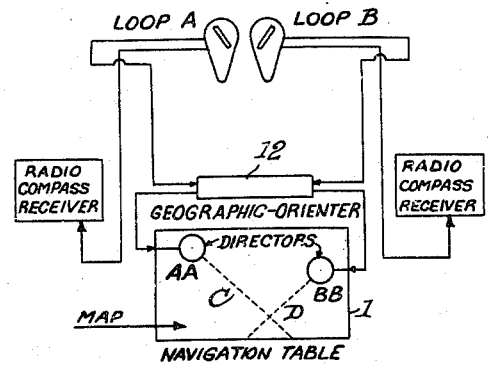
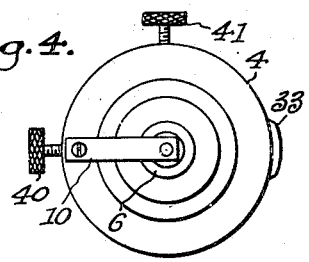
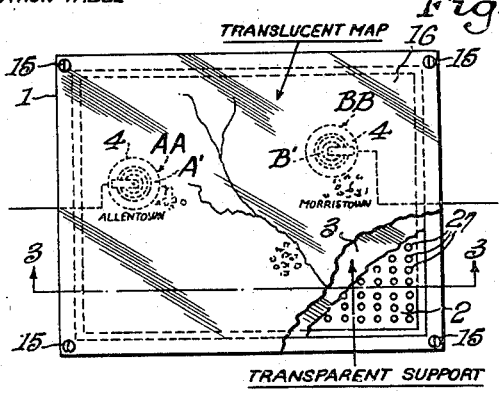
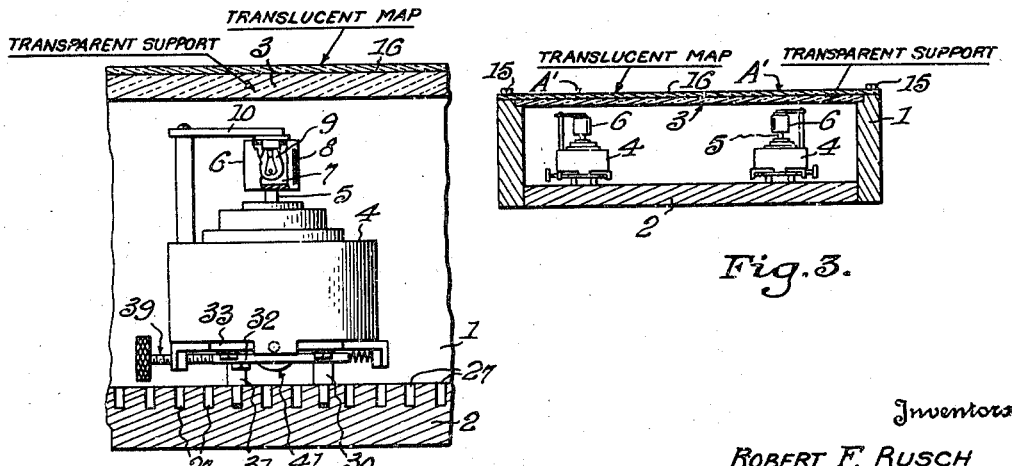
Inventors
ROBERT F. RUSCH
JOHN F. PAYNE
By Harry M. Saragovitz
ATTORNEY Oct. 25, 1949.  R. F. RUSCH ET AL  2,485,663
AUTOMATIC NAVIGATOR
Filed Sept. 14, 1945  4 Sheets-Sheet 2
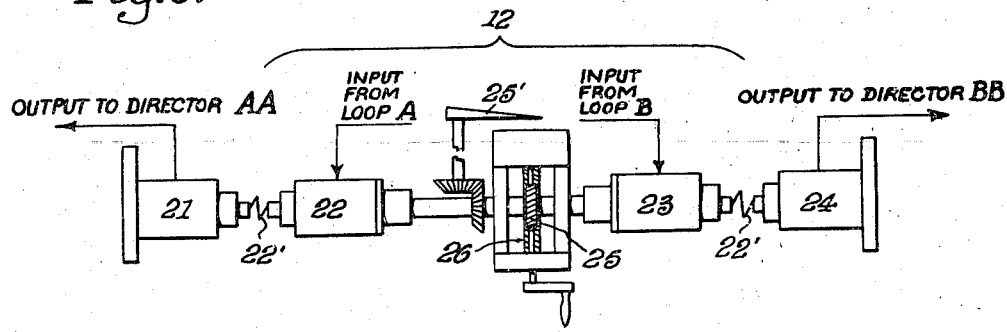
Fig. 6.
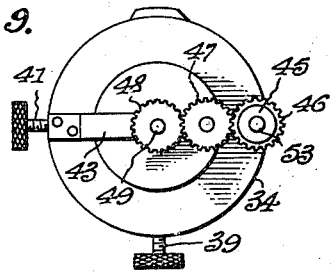
Fig. 9.
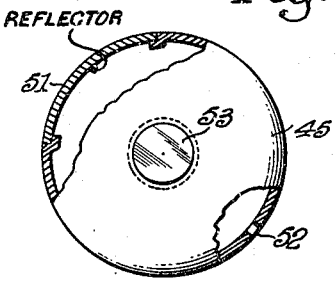
Fig. 8.
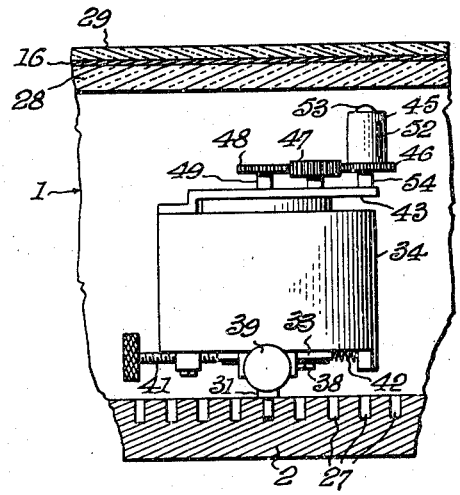
Fig. 10.
Fig. 7.
Inventors
ROBERT F. RUSCH
JOHN F. PAYNE
By
Harry M. Saragovitz
ATTORNEY Oct. 25, 1949.   R. F. RUSCH ET AL   2,485,663
AUTOMATIC NAVIGATOR
Filed Sept. 14, 1945   4 Sheets-Sheet 3
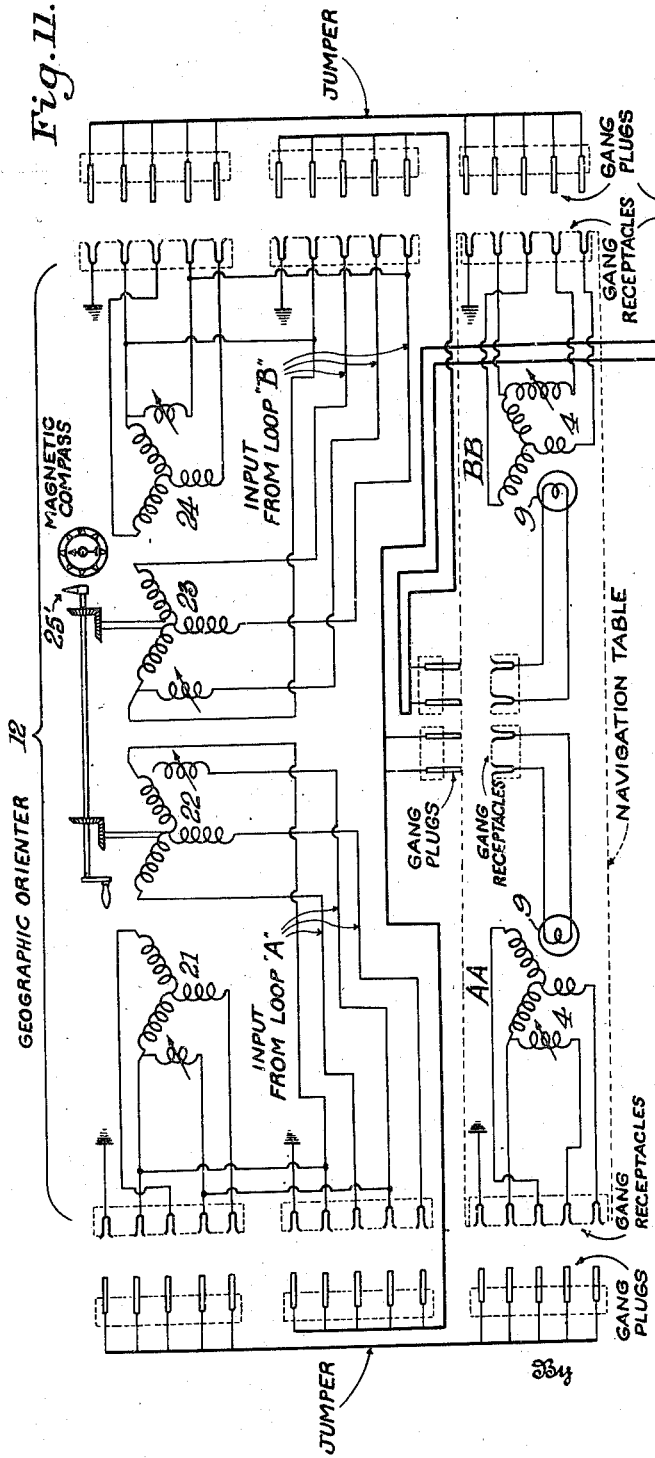
Inventors
ROBERT F. RUSCH
JOHN F. PAYNE
By Harry M. Saragovitz
ATTORNEY Oct. 25, 1949.    R. F. RUSCH ET AL    2,485,663
AUTOMATIC NAVIGATOR
Filed Sept. 14, 1945    4 Sheets-Sheet 4

Inventors
ROBERT F. RUSCH
JOHN F. PAYNE
By Harry M. Saragovitz
ATTORNEY

Patented Oct. 25, 1949

2,485,663

UNITED STATES PATENT OFFICE 2,485,663

AUTOMATIC NAVIGATOR

Robert F. Rusch, United States Army, Appleton, Wis., and John F. Payne, United States Army, Pleasantville, N. Y.

Application September 14, 1945, Serial No. 616,441

2 Claims. (Cl. 177—352)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to navigation devices, and more particularly to devices by means of which the location of an airplane can be determined instantaneously.

Navigational devices of the type herein considered rely for location indications upon signals from two or more fixed radio stations. Radio compasses or direction finders carried by an airplane may have their antennas manually or otherwise directed towards the radio stations, and when properly adjusted, associated apparatus including pointers causes two or more lines to be plotted on a map. The intersection of the lines indicates on the map the location of the airplane.

It is, therefore, an object of this invention to provide an improved aerial navigational device by means of which the actual location of an airplane can be determined instantly by the intersection of two or more light beams on a map.

These and other objects are attained by the construction and arrangement of apparatus hereinafter described and illustrated by the accompanying drawings, forming a part hereof and in which:

Fig. 1 is a block diagram of an aerial navigation device embodying the invention.

Fig. 2 is a schematic plan view of a navigation table used in the device.

Fig. 3 is a sectional view taken on the line 3—3 of Fig. 2.

Fig. 4 is a plan view of a director used in the device.

Fig. 5 is an elevational view of the director.

Fig. 6 is a schematic elevational view of geographic orienting means used in the device.

Fig. 7 is an enlarged elevational view of the lamp housing of a modified director.

Fig. 8 is a plan view of the lamp housing shown in Fig. 7.

Fig. 9 is a plan view of the modified director.

Fig. 10 is an elevational view of the director of Fig. 9.

Fig. 11 is a circuit diagram of the manually operated orienter shown in Fig. 6 as one unit 12, and of the directors and navigation table as a separate unit coupled separably to each other by jumpers and gang plugs, and arranged to be similarly coupled with the direction finding antennas A and B, for ready removal and replacement.

Fig. 12 is a bottom view of a director and its means for fixedly engaging the bottom plate of the navigation table as shown in Figs. 5 and 10, and for enabling adjustment of the director to exact position beneath a station point (as A' or B') shown on the map 16.

Fig. 13 is an elevation of the adjusting means on a director.

Fig. 14 is a circuit diagram of the complete system.

Figure 74:
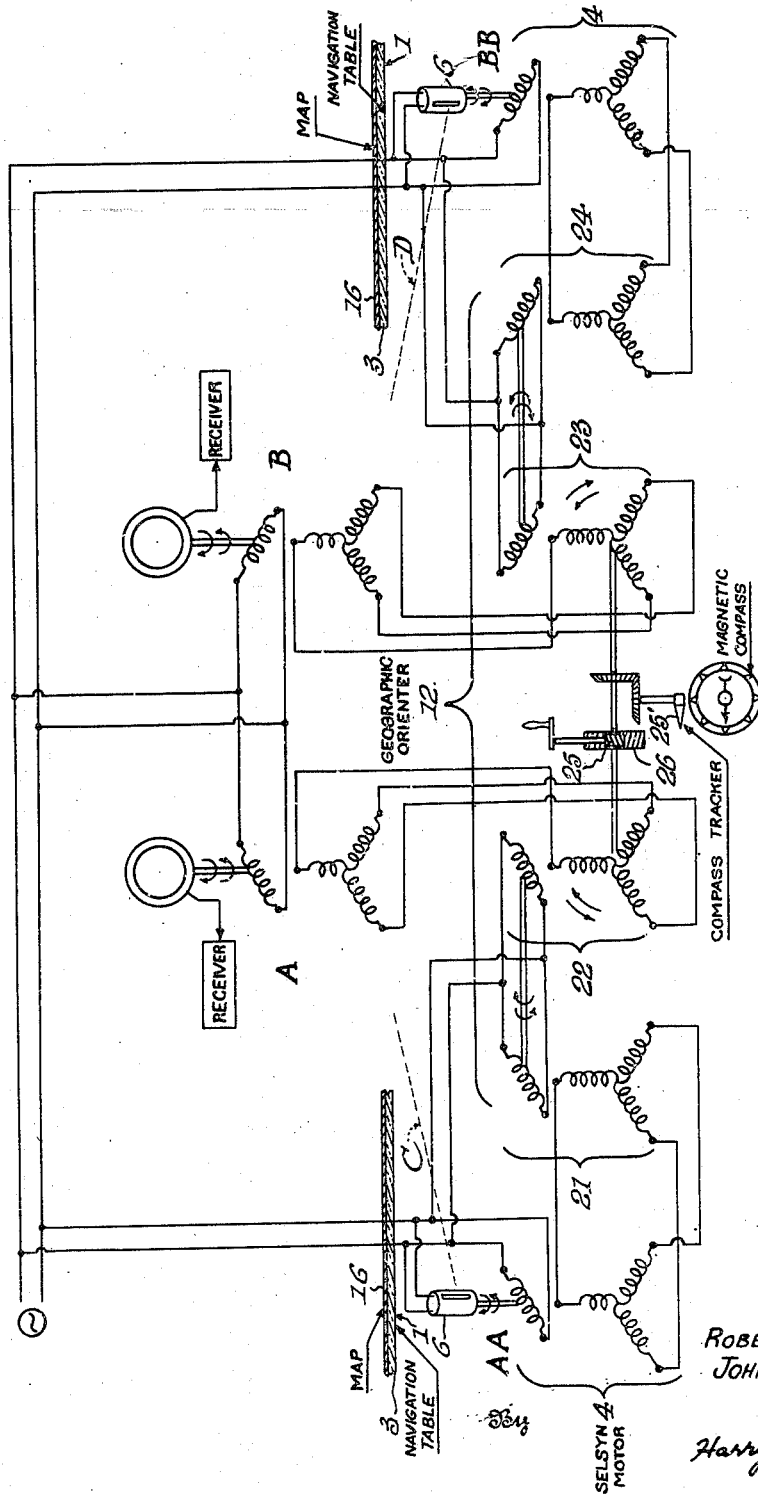

Referring to the drawings, in Fig. 1 there is shown a block diagram of an aerial navigational device, which comprises a pair of radio compasses or direction finder loop antennas and conventional hearing Selsyns to transmit the loop movements to distant instruments. The antennas are, for simplicity of disclosure, assumed to be manually adjusted so that the radio compasses are exactly in alinement with two definite ground radio stations, and the movements of the loop antennas are transferred through their Selsyns and a geographic orienter (which comprises Selsyn generators and motors) to directors contained in a navigator's table. The directors rotate lamp housings, each of which has a slit and contains a lamp. By means of this arrangement, two beams of light are projected in the navigation table, and the intersection of the beams on a map determines the location of the plane.

The maps may be standard maps of translucent material, containing in addition to the usual navigation information and topographical features, all air travel aids, with radio stations shown thereon with particular reference to their exact geographic location.

Maps may be substituted or altered and briefing information added for bombing missions or other military operations. Temporary mobile radio transmitters may be set up, marked on the map, and used for a single mission. The main requirement of the maps is that they be sufficiently translucent to allow the light beams from the directors to be visible through the map.

In Figs. 2 and 3 are shown views of a navigation table which comprises a casing 1 having a bottom 2 and a top 3 made of transparent material, which provides a space and support for maps made of translucent material. The table is arranged with fasteners 15 so as to accommodate a map 16 in one desired position, that is, top north, bottom south, to provide proper orientation. Two directors, AA—BB, having lamp housings, are mounted on the bottom 2 beneath the transparent top 3. The directors indicate the plane's location on the map and they must remain in the same geographic relationship with the particular map.

Referring to Figs. 3 to 5, each director comprises a Selsyn receiver unit 4 attached temporarily to the bottom 2. When properly centered under respective radio ground stations shown on the map, they are secured in such locations for the time during which such map is used. Mounted on the rotor shaft 5 of this unit is a lamp housing 6 having a reflector 7 and a diametrically opposite slot 8. A lamp 9 is mounted on an overhanging fixed arm 10 and so located that the resulting light beam reflected through slot 8 emanates from the center of the rotor shaft. As the rotor revolves, tracking with the compass loop, the projected light beam will point from the director toward the airplane's location. Since the director will be located under a radio station A' shown on the map 16, this light beam will be projected from the mapped radio station A' toward the map position of the airplane; and a second light beam, projected from a second director similarly located with respect to a second ground station B' on the map, will intersect this one and provide a "fix."

A compensating link between the navigation table and the radio compasses is the geographic orienter (see Fig. 1). Half of this will be described since the other half is identical except that it is wired left handed to the first half. That is to say, its output is so transmitted as to produce an increment of rotation in the director BB which is the same in direction and degree as that imparted to director AA in response to a given angular movement of the airplane around a vertical axis.

The half controlling director AA comprises two Selsyn units 21 and 22. Selsyn 21 has a fixed field and a movable armature. As the airplane moves along its course the armature of Selsyn 21 will tend to track with loop A (see Fig. 1) through its mechanical connection with Selsyn 22, and will actuate director AA so that a light beam C points from the radio station A on the map to the airplane's position. At the same time rotor of Selsyn 24 is moved correspondingly with loop B through its mechanical connection with Selsyn 23, and is actuating director BB to project light beam D from mapped radio station B' toward the airplane's projected map location. The intersection of these light beams constitutes a "fix."

When the airplane flies any course other than the one for which the map is oriented (north) light beam C (see Fig. 1) will tend to sweep across the map, since, without compensation, it will remain in the same relationship with the compass loop, and the loop will continue to align with the radio ground station. It is, therefore, necessary to make the director retain its position on the map for a given location of the plane, notwithstanding any movement of the airplane about a vertical axis. This is done by transmitting the airplane's vertical rotation compensatively to the director, as follows:

Selsyn 22 (see Figs. 6 and 11) has a movable field and a movable armature. The movable field is controlled through a worm 25 and gear 26 drive which is operated manually to track an indicator arm 25' with the needle of the airplane's magnetic compass, due allowance being made for magnetic variation and compass deviation. The apparent movement of the needle relative to the plane is inverse to the plane's rotation about a vertical axis and this motion component is imparted mechanically to the primary of Selsyn 22. The rotor secondary of this Selsyn is consequently carried through the same angle if no contrary electrical torque is manifest, and also the rotor of Selsyn transmitter 21, by reason of the coupling 22'. The latter movement, however, produces the necessary phase change (or magnetic field rotation) in the transmitter 21 to transmit electrically to the rotor of director AA the same angular movement. The transmitter 22 receives electrically, in addition, the product of angular movement of the radio compass, so that in one case, rotor of 22 moves additionally through this angle, and likewise moves the rotor of Selsyn 21; but if the change of radio bearing is in the opposite direction, the angular component put into 22 will be subtractive, so that the electrical output of the Selsyn 21 contains the torque equivalent of the algebraic sum of the angular movements of the radio compass and of the tracking device 25'. The orienting correction derived from the orienter will have a resultant movement in both directors in the same direction. The movements derived from the radio compasses will both be in either the same or reverse directions, according to the course of the airplane or other vehicle, transmitted to Selsyn 21 through a flexible mechanical coupling 22' connecting the rotor shafts of each. This causes light beam C to move in a degree and direction to compensate for the airplane's change of course, but since the compass loop base turns with the plane the net result is that light beam C will remain stationary with respect to the map.

Due to the geographic orienter operating as a whole the only means by which light beam C can be changed in direction relative to the table after radio compass "fix" is for the plane to move geographically or by tuning in another radio station.

In operation, compass receiver A is tuned in on some radio station previously selected and under the representation of which, A' on the map, director AA has been mounted. At the same time compass receiver B is tuned in on a previously selected station, under whose representation B' on the map the director BB is located. The geographic orienter is turned to the magnetic bearing, due allowance being made for magnetic variation and compass deviation. As soon as the two sets warm up and settle on the stations, light beams C and D will be so pointed by their directors that the intersection of the beams will constitute a "fix" immediately and indicate on the map the location of the airplane in respect to the ground stations tuned in.

With the apparatus above described, a means is provided for quickly determining the position of a fast moving airplane. A "fix" is established as soon as the two stations can be tuned in, and instantaneous results are possible as long as the sets are in operation.

In Figs. 5, 10 and 12–14 there is shown the mounting of the director and lamp device; and in Figs. 10 and 12–14 there is also shown a modified driving connection to the latter by which the beam therefrom is directed. Therein the navigation table has a top formed of two sheets 28, 29 of some transparent material the lower one being of sufficient rigidity to serve as a map support, and the upper sheet being much thinner, between which a map may be readily and conveniently positioned and retained as required.

The bottom 2, as shown in Figs. 2, 5, and 15 has a plurality of rows of holes 27 spaced for example 1 inch vertically and ⅞ inch horizontally, (see Fig. 15) which are adapted to receive pins 30 and 31 on the underside of plate 32 slidably positioned on a plate 33, which is slidably mounted on the underside of the stator part of a Selsyn receiver 34, forming a part of a director. (See Figs. 12, 13, 14.) Plate 32 is provided with slots 35 to enable it to be slid horizontally and held in adjusted positions by set screws 36; and plate 33 is also provided with slots 37 to enable it to be slid vertically and held in adjusted position by screws 38. Plate 32 is adjusted by a threaded bolt 40 and spring 39, and plate 33 is adjusted by a threaded bolt 41 and spring 42. By means of this arrangement the pins 30, 31 can be positioned in any pair of holes 26 in the bottom 27, and the Selsyn rotor axis adjusted to any required position over one pin, or between or adjacent the selected two holes.

Mounted on the top of the Selsyn 34 is a bracket 43 (Figs. 9-10) supporting a vertical shaft 44 (Fig. 7) which is telescoped by a hollow shaft 54 supporting a lamp housing 45 which has fixed thereto a gear 46 in mesh with an intermediate gear 47 in mesh with a gear 48 fixed to the shaft 49 of the Selsyn 34, the gears having a one to one ratio. Mounted in the lamp housing is a lamp 50, and the housing is provided with a reflector 51, slit 52, and a light window 53, which provides means to enable the director to be exactly centered under the desired point on a map. The lamp is mounted on the shaft 44 and remains stationary on bracket 43 and only the reflector and resulting light beam will revolve. (See Figs. 7, 8, 9, 10.)

Operation of a loop antenna gives a station-to-plane component, and operation of the orienter, gives the earth's magnetic component. The resultant of these two components gives the true geographic direction from the mapped station to the map position of the plane, provided that compensation is made for magnetic variation.

Magnetic variation is compensated for by rotatively adjusting the secondary of orienter Selsyn 68 to right or left depending on whether the variation is east or west. Servo mechanisms suitable for automatically moving the field elements at 22 and 23 of the orienter 12 to correspond with relative movements of a magnetic compass needle are known, and may be employed in place of manual operation, if desired.

In such case, radio stations do not have to be previously selected since the directors can be moved to a different location at any time and securely clamped in place. With the automatic geographic orienter it is only necessary to switch it into operation tune in the compass receivers, locate the directors under the appropriate points, adjust the orienter for magnetic variation, and as soon as the sets warm up and take a bearing a "fix" will result immediately. From then on the location of the airplane will be known at all times and it will only be necessary to change maps or radio stations at necessary intervals, adjusting the directors to the appropriate new locations.

The above description is to be considered as illustrative and not descriptive of the invention of which modification can be made without departing from the spirit and scope of the invention as set forth in the appended claims.

The invention having been described, what is claimed is:

1. A Selsyn vehicle locator for navigation maps and the like comprising a map holder including a body surface member having a multiplicity of parallel rows of holes, a Selsyn pointer unit having a base, at least two pins thereon spaced to engage in any corresponding number of said holes of similar spacing, an intermediate base slidable in one direction on said base, means to releasably secure the intermediate base in adjusted positions on the base member, said Selsyn unit having a stator slidable on the intermediate base in a direction at right angles to the direction of slidable movement of the intermediate base on said base, and means to releasably secure the stator in adjusted positions on the intermediate base.

2. The structure of claim 1 in which said Selsyn pointer unit includes a rotor on an axis normal to the planes of said body surface and paths of sliding movement of the intermediate base and stator, said rotor having a lamp housing thereon constructed with a window on said axis over the rotor, a lamp therein and means to energize the lamp, whereby when said unit is positioned on said body surface member rays from said window will indicate on a superposed map the geographical map location of the axis of the Selsyn pointer unit.

ROBERT F. RUSCH.
JOHN F. PAYNE.

REFERENCES CITED

The following references are of record in the file of this patent:

UNITED STATES PATENTS

| Number | Name | Date |
| --- | --- | --- |
| 2,080,511 | Sjostrand | May 18, 1937 |
| 2,246,496 | Asbury | June 24, 1941 |
| 2,307,029 | Elm | Jan. 5, 1943 |
| 2,311,650 | Elm | Feb. 23, 1943 |
| 2,361,956 | Moseley | Nov. 7, 1944 |
| 2,364,731 | Luck | Dec. 12, 1944 |
| 2,366,772 | Ebeling | Jan. 9, 1945 |